United States Patent
Brindza et al.

[11] Patent Number: 6,003,561
[45] Date of Patent: Dec. 21, 1999

[54] FLEXIBLE CRYOGENIC CONDUIT

[75] Inventors: Paul Daniel Brindza, Yorktown; Robin Renee Wines, Norfolk; James Joseph Takacs, Hayes, all of Va.

[73] Assignee: Southeastern Universities Research Assn., Inc., Newport News, Va.

[21] Appl. No.: 09/061,477

[22] Filed: Apr. 16, 1998

[51] Int. Cl.$^6$ ....................................................... F16L 11/11
[52] U.S. Cl. ........................... 138/124; 138/129; 138/121; 138/149
[58] Field of Search ........................................ 138/121, 149, 138/122, 137, 140, 129, 124; 62/50.7

[56] References Cited

U.S. PATENT DOCUMENTS

| | | | |
|---|---|---|---|
| 4,106,528 | 8/1978 | Laing | 138/149 |
| 4,233,816 | 11/1980 | Hensley | 138/149 X |
| 4,303,105 | 12/1981 | Rohner | 138/149 |
| 5,485,870 | 1/1996 | Kraik | 138/121 X |

*Primary Examiner*—Patrick Brinson

[57] ABSTRACT

A flexible and relatively low cost cryogenic conduit is described. The flexible cryogenic conduit of the present invention comprises a first inner corrugated tube with single braided serving, a second outer corrugated tube with single braided serving concentric with the inner corrugated tube, and arranged outwardly about the periphery of the inner corrugated tube and between the inner and outer corrugated tubes: a superinsulation layer; a one half lap layer of polyester ribbon; a one half lap layer of copper ribbon; a spirally wound refrigeration tube; second one half lap layer of copper ribbon; a second one half lap layer of polyester ribbon; a second superinsulation layer; a third one half lap layer of polyester ribbon; and a spirally wound stretchable and compressible filament.

9 Claims, 2 Drawing Sheets

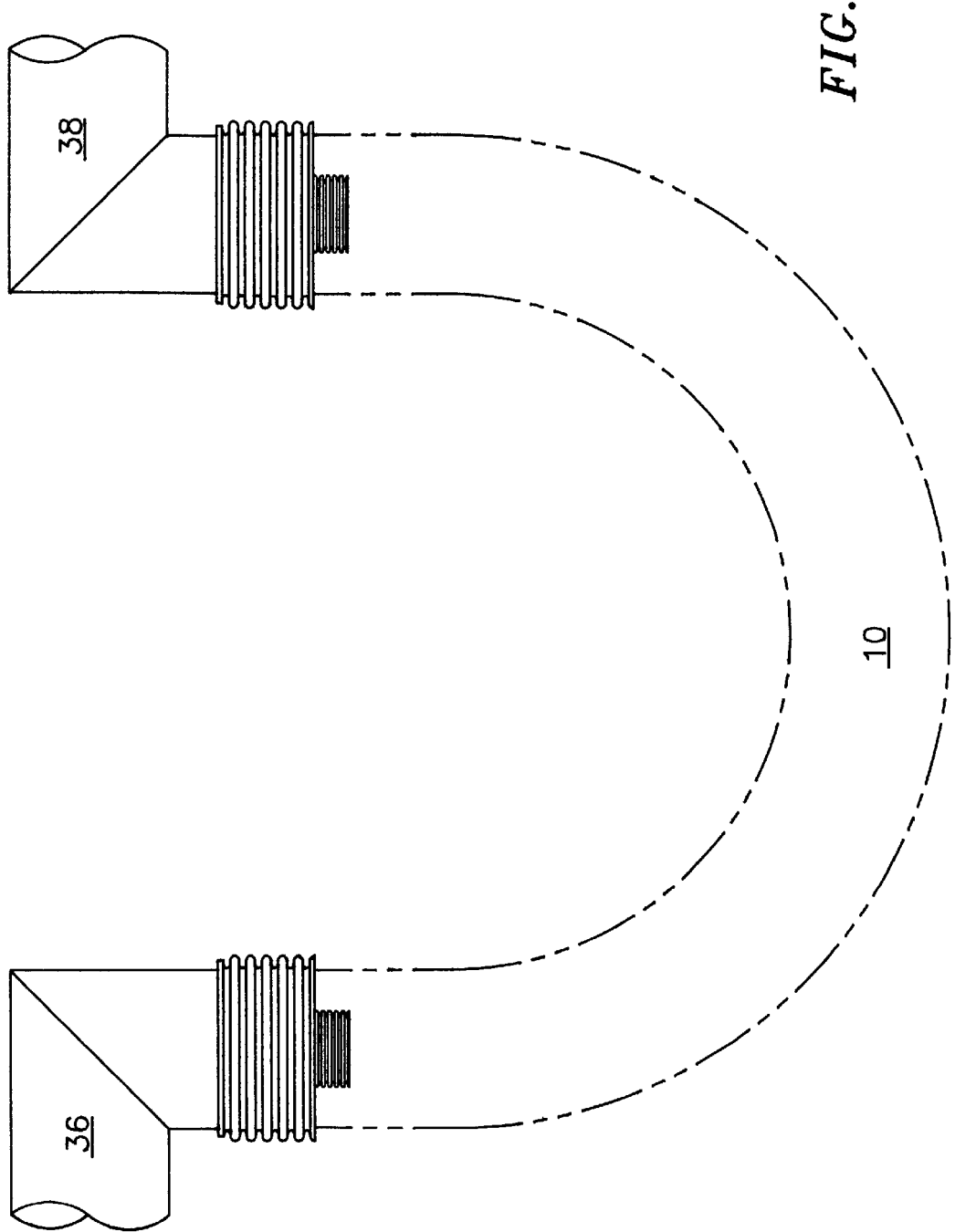

FLEXIBLE CRYOGENIC CONDUIT

The United States of America may have certain rights to this invention, under Management and Operating Contract DE-AC05-84ER40150 from the United States Department of Energy.

FIELD OF THE INVENTION

The present invention relates to an improved, easy to manufacture and comparatively inexpensive yet very efficient conduit for cryogenic fluids.

BACKGROUND OF THE INVENTION

The need to efficiently conduct cryogenic fluids in such applications as particle accelerators, superconductive material applications etc. has spawned the development of numerous cryogenic fluid conduit designs. While these prior art designs have apparently been successful in achieving successful transfer of cryogenic fluids, they have demonstrated certain shortcomings. Most notably, these shortcomings related to flexibility and cost as reflected in the difficulty to manufacture. While flexibility has been achieved in some designs, it has normally been at a significant manufacturing cost penalty.

An example of such a flexible cryogenic conduit is described in U.S. Pat. No. 4,492,089 to Rohner et al issued Jan. 8, 1985. This patent describes a cryogenic conduit consisting of two concentric corrugated tubes having a series of five wound members therebetween. The wound members consist of a plurality of metallic ribbons having conduits for coolant welded thereto, a helical spacer and several layers of "super insulation". The entire assembly is finally covered with a thermoplastic envelope or jacket. While such a structure may prove adequate for the transfer of cryogenic fluids, its flexibility is significantly impaired by its structure, but more importantly, the manufacture of the metallic ribbons with conduit welded thereon is extremely expensive and will render the cost of the conduit extremely high.

Other cryogenic conduit devices are disclosed in U.S. Pat. Nos. 4,344,462, 3,706,208, and 4,380,253.

SUMMARY OF THE INVENTION

According to the present invention there is provided a flexible, and comparatively inexpensive yet highly efficient tubular structure for the transfer of cryogenic fluids. The tubular structure of the present invention comprises a first inner corrugated tube with single braided serving for containment of the cryogenic fluid, a second outer corrugated tube with single braided serving arranged concentrically with respect to the inner tube and, arranged outwardly about the periphery of the inner tube and between the inner and the outer tubes: a layer of superinsulation, a one-half lap layer of polyester ribbon, a one-half lap layer of copper ribbon, a spirally wound common refrigeration tube, a second one-half lap of copper ribbon, a second one-half lap layer of polyester ribbon, a second layer of superinsulation, a third one-half lap layer of polyester ribbon, and a spirally wound stretchable and compressible filament. The use of commonly available materials in a simple-to-manufacture configuration, provides a relatively very inexpensive yet efficient structure for the transfer of cryogenic fluids.

OBJECTS OF THE INVENTION

It is an object of the present invention to provide a highly efficient yet flexible cryogenic fluid conduit.

It is a further object of the present invention to provide a highly efficient cryogenic fluid conduit which, because of the simplicity of its design and the materials used in its manufacture, is comparatively inexpensive relative to similar prior art conduits.

Other objects of the invention will be better understood from the following description when read in conjunction with the appended drawings.

DESCRIPTION OF THE DRAWINGS

The invention will be more fully understood from the following detailed description taken in connection with the accompanying drawings, which form part of this application and wherein:

FIG. 2 is a plan view, partially in phantom, showing the flexible cryogenic conduit of the present invention in its installed configuration.

DESCRIPTION OF THE INVENTION

Figure 1:
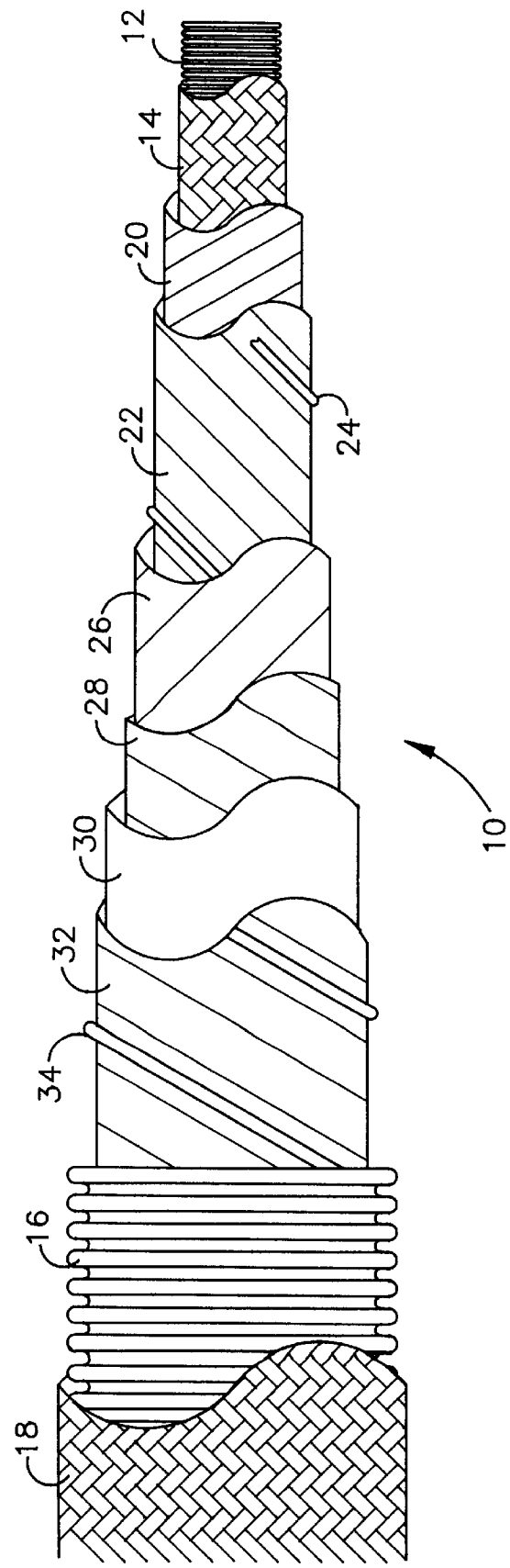
FIG. 1 is a cut back view of the flexible cryogenic conduit of the present invention showing each of the discrete layers and members.

As shown in FIG. 1, the tubular structure 10 of the present invention comprises a first inner corrugated tube 12 with single braided serving 14 for containment of the cryogenic fluid. A second outer corrugated tube 16 with single braided serving 18 is arranged concentrically with respect to inner corrugated tube 12. Outer single braided serving 18 serves as the outermost layer of the cryogenic fluid conduit 10 of the present invention. Both inner corrugated tube 12 and outer corrugated tube 16 are preferably produced from 316 stainless steel. According to a highly preferred embodiment of the present invention, inner corrugated tube 12 has an i.d. of 1" and outer corrugated tube 16 has an i.d. of 5". Both inner corrugated tube 12 and outer corrugated tube 16 are commonly referred to in the art as "corrugated hose".

Wound outwardly about the periphery of inner corrugated tube 12 and between inner corrugated tube 12 and outer corrugated tube 16 are a series of insulating and cooling layers. The first of these layers 20 is a layer of superinsulation, preferably comprising 30 plies of spiral wound superinsulation. According to a preferred embodiment, these layers comprise one half inch spiral wound aluminized polyester and a spun bonded polyester matrix. The preferred polyester is Mylar.

The next layer 22 comprises a one half lap spiral wound layer of clear 2"×0.002" polyester film or ribbon. Again, the preferred polyester is Mylar.

About layer 22 is a one half lap helix of copper foil or ribbon. According to a preferred embodiment, layer 22 comprises 1.75"×0.001" copper foil.

Wrapped about layer 22 is a refrigeration tube 24 suitable for the introduction of liquid nitrogen as a coolant for the cryogenic conduit 10. Refrigeration tube 24 may be made of aluminum or copper, but copper is the preferred material. Refrigeration tube 24 is preferably wrapped at a 6" pitch.

Over refrigeration tube 24 is wrapped a second one half lap helix of copper foil or ribbon 26. Again, this copper foil layer is preferably 1.75"×0.001".

A second layer 28 of one half lap clear polyester ribbon is helically wrapped over copper foil layer 26. Once again, this material is preferably Mylar 2"x>002".

A second superinsulation layer 30 is wound over layer 28. This material and its configuration are preferably identical to that of layer 20.

A third helically wrapped clear polyester film or ribbon layer 32, which is preferably identical to layers 22 and 28, is then wound over superinsulation layer 30.

About layer 32 is wrapped a stretchable and compressible filament 34 of adequate thickness to serve as a spacer between polyester layer 32 and outer corrugated tube 16. According to a preferred embodiment of the present invention, this filament consists of a simple 3/16" diameter nylon rope wound at a 4" pitch.

This simple 12 layer structure constructed of commonly available materials is easily fabricated using commonly applied manufacturing techniques. Hence, its cost of materials and manufacture is extremely low. The helically wound layers of polyester film and the presence of filament 34 permit flexing, i.e. rotation of the conduit with no significant loss of containment or temperature maintenance efficiency.

FIG. 2 shows the flexible cryogenic fluid conduit 10 in a typical application. In this situation, conduit 10 is joined to two standard, fixed, non-flexible conduit members 36 and 38 using standard joining techniques for such devices. The presence of conduit 10 permits both rotational and longitudinal motion of non-flexible conduit members 36 and 38 relative to one another, as will often occur in the application of such cryogenic conduits in practical application. In one such application, relative rotations of from 12 to 90 degrees and longitudinal movements of up to 16 inches were experienced without loss of efficiency.

In this application, wherein liquid helium was used to cool the superconducting magnets of a spectrometer and a cryogenic target for hydrogen, deuterium and helium, helium was delivered at 2.5 atmospheres and 4.5 degrees Kelvin Liquid nitrogen was supplied through tube 24 at 4 atmospheres and 80 degrees Kelvin. Continuous monitoring of the flexible conduit showed a temperature variation of less than 0.8 degrees Kelvin over a one month operating window, all with continuous usage and flexing. Heat leakage over a similar period for the line was 10.+ or −0.25 watts. Thus, it has been shown in practical usage that this simple to construct and cost effective flexible cryogenic conduit is entirely adequate for such demanding applications.

It is intended that the descriptions of the preferred embodiments presented herein are illustrative only, and that variations and modifications thereof will be readily apparent to the skilled artisan. Other embodiments of the invention are intended to be within the scope of this invention which is intended to be limited only by the scope of the appended claims.

What is claimed is:

1. A flexible cryogenic conduit comprising:

a first inner corrugated tube with braided serving;

a second outer corrugated tube with braided serving, concentric with said first inner corrugated tube;

and arranged outwardly about the periphery of said inner corrugated tube and between said inner corrugated tube and said outer corrugated tube multiple layers comprising:

a first superinsulation layer adjacent to and overlaying said inner corrugated tube;

a one half lap layer of polyester ribbon adjacent to and overlaying said first superinsulation layer;

a first one half lap layer of copper ribbon adjacent to and overlaying said polyester ribbon;

a spirally wound refrigeration tube adjacent to said first one half lap layer of copper ribbon;

a second one half lap layer of copper ribbon adjacent to and on the outside of said spirally wound refrigeration tube;

a second one half lap layer of polyester ribbon adjacent to and overlying said second one half lap layer of copper ribbon;

a second superinsulation layer adjacent to and overlying said second one half lap layer of polyester ribbon;

a third one half lap layer of polyester ribbon adjacent to and overlaying said second superinsulation layer; and a spirally wound stretchable and compressible filament between said third one half lap layer of polyester ribbon and said second outer corrugated tube.

2. The flexible cryogenic conduit of claim 1 wherein said polyester ribbon comprises 2"×0.002" clear polyester.

3. The flexible cryogenic conduit of claim 2 wherein said polyester ribbon is comprised of Mylar.

4. The flexible cryogenic conduit of claim 1 wherein said superinsulation layers comprise 30 spirally wound plies of one half inch aluminized Mylar and a spun bonded Mylar matrix.

5. The flexible cryogenic conduit of claim 1 wherein said copper ribbon is 1.75×0.001".

6. The flexible cryogenic conduit of claim 1 wherein said filament is 3/16" nylon rope wound at a 4" pitch.

7. The flexible conduit of claim 1 wherein said inner and outer corrugated tubes are stainless steel.

8. The flexible cryogenic conduit of claim 1 wherein said refrigeration tube comprises a 0.25" copper or aluminum tube wound at a 6" pitch.

9. The flexible cryogenic conduit of claim 8 wherein said refrigeration tube is copper.

* * * * *